CONTROL APPARATUS

Filed Aug. 20, 1953 2 Sheets-Sheet 1

WITNESSES:

E. A. McCloskey.

E. F. Oberheim

INVENTORS
Arne P. Rasmussen
and Frank J. Huddleston.
BY
Paul E. Friedemann
ATTORNEY Sept. 23, 1958 A. P. RASMUSSEN ET AL 2,853,255

CONTROL APPARATUS

Filed Aug. 20, 1953

WITNESSES:

E. A. McCloskey

E. F. Oberheim

INVENTORS
Arne P. Rasmussen
and Frank J. Huddleston.
BY
Paul E. Friedemann
ATTORNEY 2,853,255

CONTROL APPARATUS

Arne P. Rasmussen, Glen Burnie, and Frank J. Huddleston, Millersville, Md., assignors to Westinghouse Electric Corporation, East Pittsburgh, Pa., a corporation of Pennsylvania Application August 20, 1953, Serial No. 375,517

8 Claims. (Cl. 244—78)

This invention relates generally to a control system and an apparatus providing for selective automatic and manual control of a body or member from a common manually operated controller.

More particularly, this invention is directed to a drive for an aircraft control surface wherein a manually operated controller may be selectively utilized to directly drive the control surface in one mode of control, and in a second mode of control may be utilized to control a servo having a driving connection with the control surface.

With the introduction of booster systems and automatic pilots to aircraft, the practice has been to provide a separate controller for the automatic pilot and sometimes also the booster. This separate controller is used to apply command signals to the autopilot to alter the existing flight path. In such installations, synchronization of the separate automatic pilot controller with the manual controller or with the control surface during intervals when the control initiates in the pilot's conventional controller or stick, is usually necessary to minimize transients when switching, for instance, from manual to automatic pilot control.

When the control for both manual and automatic pilot modes of operation originates in a single controller, such as the conventional controller or stick on the aircraft, other problems exist requiring a different solution. In such an application, the position of the conventional controller is the controlling factor in both modes of operation (manual and automatic pilot or boost) and is utilized in each instance in positioning the control surface or surfaces to achieve the flight pattern commanded. In the manual mode, direct mechanical linkages comprise the drive from the conventional controller to the control surfaces. In the automatic pilot or boost drive or drives, suitable pick-offs responsive to the conventional controller's position provide the flight command signals.

However, a given position of the stick cannot at the same time call for a position of the control surface and a certain maneuver command signal to the autopilot. Thus, during automatic flight, it is necessary that the conventional controller be decoupled from the control surface over a range of displacements so that control surface movement, or movement of linkages associated therewith, is not reflected in movement of the conventional controller. Yet, complete decoupling must be avoided so that manual override of the automatic control is available, if needed.

Accordingly, it is one object of this invention to provide a control system for a driven member wherein provision is made for selective control of the driven member through a servo drive or a manual drive from a single controller.

A more specific object of this invention is to provide an aircraft flight control system embodying boost and manual drives for a control surface in which the conventional pilot's controller is selectively utilized in both modes of control.

Further to the preceding object, it is also an object of this invention to provide a system of the character referred to in which limited decoupling in the manual drive is provided during operation in the boost mode of control.

It is also an object of this invention to provide a system of the character referred to in which decoupling of the manual linkage depends upon the boost power supply and which is provided with a fail-safe feature in the event of power supply failure.

Another object of this invention is to provide a novel decoupling mechanical linkage between a pair of movable members.

More specifically, it is an object of this invention to provide a two-position mechanical linkage between driving and driven members which in one position affords direct mechanical connection between the members, and which in a second position permits relative movement of the members over a predetermined range of relative movements.

The foregoing statements are merely illustrative of the various aims and objects of this invention. Other objects and advantages will become apparent upon a study of the following disclosure when considered in conjunction with the accompanying drawings, in which.

Figure 1:
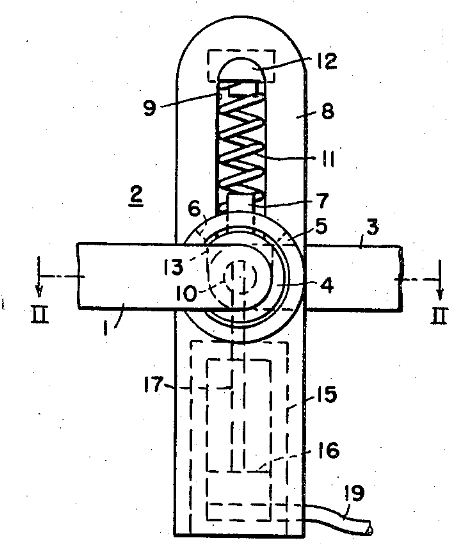
Figure 1 is a side elevational view of a decoupling linkage embodying the principles of this invention.
Figure 3:
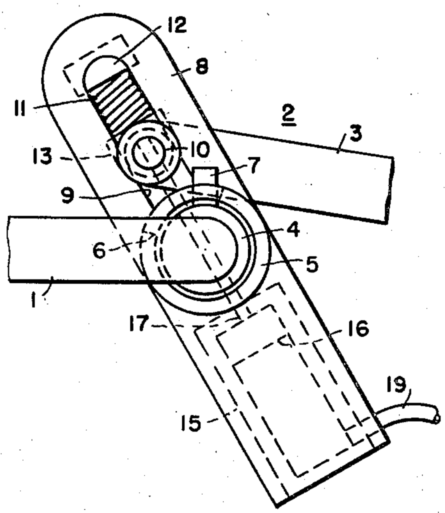
Fig. 3 is a side elevational view of the decoupling linkage of Fig. 1, showing one position of operation.
Figure 2:
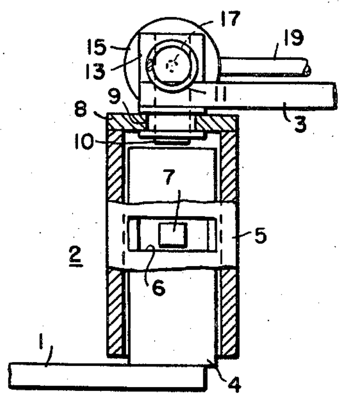
Fig. 2 is a sectional view taken on the line II—II of Fig. 1.
Figure 4:
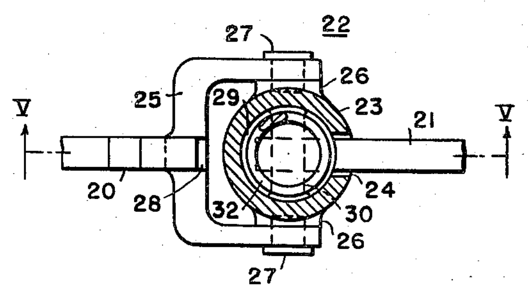
Fig. 4 is a top view of a modification of the invention illustrated in Fig. 1.
Figure 5:
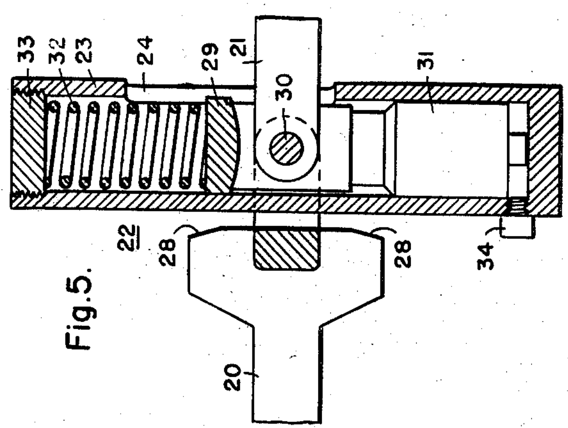
Fig. 5 is a sectional view taken on the line V—V of Fig. 4.
Figure 6:
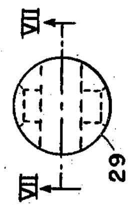
Figs. 6 and 7 are details of a moving part of this modification of the invention.
Figure 7:
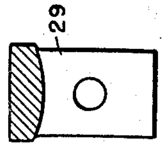

The elementary aspects of the decoupling linkage embodied in this invention are illustrated in Figs. 1, 2 and 3, wherein an input rod 1 adapted for connection to the conventional controller or control stick of an aircraft is connected by means of a decoupling linkage, generally designated 2, to an output rod 3 adapted for connection to the control surface of the aircraft. The decoupling linkage comprises a cylinder 4 which is secured to the end of input rod 1 and is rotatably mounted for limited angular movement within a sleeve 5 having a slot 6 therein which receives a pin 7 secured to the cylinder 4. A link 8 provided with a slot 9 is secured to the sleeve 5 in such a position that when the pin 7 is disposed substantially centrally in the slot 6, the axis of slot 9 occupies a position which is substantially perpendicular to the axis of the input rod 1. A pin 10, which is secured to the end of output rod 3, is slidably fitted in the slot 9, and a compression spring 11, which is compressed between a bracket 12 mounted at the upper end of the slot 9, as viewed in Fig. 1, and a bracket 13 mounted on the pin 10 biases the output rod downwardly so that pin 10 rides in the bottom of the slot, as seen in Fig. 1. In this position of the output rod, the axis of pin 10 coincides with the axis of cylinder 4.

The output rod 3 is displaced upwardly in the slot 9, as seen in Fig. 3, by means of a hydraulic cylinder 15, which is mounted on the link 8 below the output rod 3. This cylinder is provided with a piston 16 connected to a piston rod 17 which is connected at its upper end to pin 10 on the output rod 3. A flexible fluid conductor 19 communicating with the cylinder 15 below piston 16 provides means for introducing hydraulic pressure to the cylinder.

Thus, when hydraulic pressure is intoduced into the cylinder, the piston is driven upwardly against the force of compression spring 11 so that the axis of pin 10 is displaced from the axis of the cylinder 4. In this position when force is applied to either the input rod or the output rod, the force is not transmitted across the linkage but results in angular displacement of the linkage within limits imposed by the slot 6 and pin 7, as seen in Fig. 3. Thus, means are provided for effectively disconnecting the input rod from the output rod over a limited range of movements.

Although a hydraulic actuator has been herein disclosed for displacing the output rod 3 against the force of compression spring 11, it will be appreciated that other means may be utilized to effect this displacement. For instance, it is conceivable that an electric solenoid may be utilized in place of the hydraulic piston. Similarly, a rack may be connected to output rod 3 and slidably mounted in guides on the link 8. This rack may be actuated by means of a motor-driven pinion in much the same manner as an electric starter is utilized on an automobile. In this arrangement, the pinion is normally disengaged, but upon the application of electric power may be drawn into engagement with the rack at which time the motor circuit is completed to energize the motor and drive the output rod 3 upwardly in the same manner as accomplished by the hydraulic actuator. Means may be provided in the form of switching actuated by an upper limit position on the rack to deenergize the motor when this limit is reached, and a spring-released, magnetically operated pawl engaging the rack or a ratchet on the rack may be utilized to hold the rack in displaced position until such time as current to the magnetically actuated pawl is discontinued. These and other equally conventional arrangements are readily apparent.

The mechanical principles illustrated in Figs. 1 through 3 are embodied in the arrangement illustrated in Figs. 4 through 7. In this embodiment, the input rod 20 is connected to the output rod 21 by means of a decoupling linkage, generally designated 22, embodying a tubular member 23 having a longitudinally disposed slot 24 therein. The end of input rod 20 is forked, as indicated at 25, to straddle bosses 26 located in diametrically opposite positions substantially centrally of the longitudinal dimension of the tube. The forked end of input rod 20 is pivotally connected to the tube over these bosses by means of bolts 27, clearing through holes in the respective forks and threading into the bosses 26. Angular movement of tube 23 about this axis of freedom is limited by means of stops 28 which are formed on the input rod 20.

Output rod 21 is connected to a slider 29 which is mounted inside the tube 23. This slider is slotted for a portion of its length to receive the end of output rod 21 which is secured within the slider by means of a bearing pin 30. A piston or plunger 31 is slidably fitted within the closed bottom end of tube 23, and the bottom end of the slider 29 rests upon the upper end of the piston which limits the downward movement of the slider to a position in which the axis of pin 30 coincides with the axis of pivoting of the tube 23 to the forked end of the input rod 20. A compression spring 32 is compressed between the upper end of slider 29 and a plug 33 which threads into the top of tube 23. Compression spring 32 provides the force necessary to drive the output rod downwardly to its lowermost position and hold it in this lowermost position during force transmission between the input and output rods. The spring force is sufficient to close the link against a load which could exist when the pilot is attempting to override the autopilot. A suitable coupling 34 which is adapted to receive a fluid conductor, not shown, is threaded into the bottom end of tube 23 to admit hydraulic pressure to the bottom side of piston 31. The operation of this embodiment of the invention being in principle the same as that previously discussed for the first embodiment will be understood in connection with that description.

Figure 8:
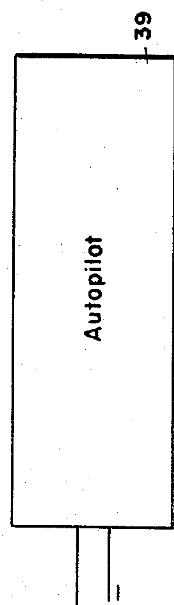
Fig. 8 is a diagrammatic illustration of an aircraft flight control system embodying the principles of this invention.

A general system embodying such a decoupling linkage is illustrated in Fig. 8, which shows in a diagrammatic way a flight control system for controlling, for example, the elevator system of an aircraft. The illustration of this invention for controlling the aircraft about a single axis is made only in the interest of simplicity. The application of this system to the aileron and the rudder systems of an aircraft will be understood from the discussions concerning the elevator control.

The arrangement illustrated is capable of modes of operation as follows: (1) automatic control of the elevator boost system by the autopilot, (2) manual control of the autopilot by command signals produced by stick movement, (3) manual override of the automatic pilot control at the elevator boost system, and (4) direct manual control of the elevators when the hydraulic pressure is off.

A fifth mode of operation may be obtained in the present system, as will be apparent hereinafter, in which direct control of the elevator boost system without the operation of the autopilot may be obtained. Inasmuch as the elevator boost system involves a hydraulic actuator, namely a boost cylinder which drives the elevator control surfaces, and this boost cylinder is actuated by hydraulic valves, provision must be made in the system for supplying hydraulic pressure to the hydraulic valves while preventing the application of hydraulic pressure to the decoupling link so that a direct mechanical connection across the link exists under this condition. This will be discussed more fully hereinafter.

In the system of Fig. 8, a hydraulic actuator or boost cylinder 36 drives the elevator E and is controlled by a boost valve 37 controlled by a control valve 38 under the control of an autopilot 39, the latter being shown only in block form in the interest of simplicity. The boost valve is also controllable by stick S through a mechanical linkage including decoupling link 22. It will be understood that decoupling link 22 in this arrangement is the same as that illustrated in detail in Figs. 4 through 7. Hence, a detailed showing at this point is not believed to be necessary. The autopilot may be any suitable type capable of controlling a valve such as control valve 38. Such types are presently commercially available. A preferred type is illustrated in a copending application of Clinton R. Hanna, Serial No. 785,983 filed November 14, 1947, entitled Control Systems for Craft Operable in Space, and assigned to the assignee of this invention. This is now U. S. Patent 2,638,288. The autopilot of this copending application embodies nontumbling gyroscopes, providing among other things unlimited rate stabilized maneuverability of the aircraft through manual control of the autopilot from the stick. In the instant case, manual control of the autopilot is obtained by command signals derived from an electrical pick-off, such as potentiometer 40 driven by the conventional control stick S.

The system will be better understood from the following detailed description. Boost cylinder 36 includes a piston 42 having a piston rod 43 extending through one end of the cylinder. The outer end of piston rod 43 is pivotally mounted to a fixed support 45. The other end of the boost cylinder is provided with an extension 46, the end of which is adapted for pivotal connection to elevator control horn 47.

Expanding and contracting movements of the boost cylinder assembly are controlled by the boost valve 37 which is mounted directly on the boost cylinder. The boost valve 37 is provided with a sliding valve stem 49 carrying respective slide valves 50 and 51 which seal the ends of respective openings 52 and 53, affording communication between the boost valve and the ends of the boost cylinder. High pressure hydraulic fluid is admitted to the boost valve by fluid conductor 55, which enters the boost valve housing at a point intermediate the boost valves and the return line 56 for the hydraulic system enters the boost valve housing at the right side of slide valve 51. The space at the left side of slide valve 50, as viewed, communicates with the return port of the boost valve through a hole 57 which extends axially of the valve stem 49.

With this arrangement when the valve stem is displaced to the left, as viewed, both passages 52 and 53 are opened in an amount depending upon the displacement. When displacement to the left occurs, the inlet fluid conductor 55 is connected to passage 52 and the return line 56 is connected to passage 53. This displaces the boost cylinder 36 to the left and applies down elevator. When the valve stem 49 is displaced to the right, the connections are reversed and hydraulic pressure is admitted to the boost cylinder through passage 53. In this instance, the passage 52 communicates with the space on the left side of slide valve 50, and the fluid which is being exhausted from the left side of the power piston 42 passes through hole 57 in the valve stem to the return line 56. It is to be appreciated that the representation of the assembly of valves and the boost cylinder is schematic in nature and is intended to illustrate the function of the system rather than a practical embodiment of such an arrangement.

Valve stem 49 is connected to a piston 58 which strokes within a cylinder 59. Movement of this piston is controlled by the control valve 38. High pressure hydraulic fluid is admitted to opposite sides of piston 58 through parallel branches of the high pressure line 55 which enter through the bottom side of cylinder 59. The pressure existing on opposite sides of piston 58 is controlled by respective poppet valves, generally designated 61 and 62, mounted within a fluid-tight housing 63 which houses the electromagnetic actuator for the valves. Poppet valves 61 and 62 control the oil flow from opposite sides of piston 58 which passes through respective passages 64 and 65 of the housing 63. This housing is drained to the return line 56. The poppet valves comprise respective valve stems 67 and 68 having flat lower faces disposed over the ends of passages 64 and 65 in the housing 63. These valve stems are thrust upwardly against a pivoted armature 69 by the impact of fluid exhausting into the control valve housing. The armature is controlled by a magnetic circuit including respective coils 70 and 71 which in turn are controlled by the output of the pitch channel of autopilot 39. Thus, for instance, if the excitation of coil 70 is increased and the excitation of coil 71 is decreased, a counterclockwise torque is applied to armature 69, tending to close poppet valve 61 and to further open poppet valve 62. This changes the dimensions of the fluid gaps of the valves in such a way as to increase the pressure on the left side of piston 58, driving the valve stem 49 to the right which in turn displaces the boost cylinder to the right and applies up elevator to the aircraft. When a clockwise torque is applied to armature 69, the operation is reversed and the boost cylinder is displaced to the left, as viewed, to apply down elevator. Details of this control valve may be had by reference to a copending application of Clinton R. Hanna, Kirk A. Oplinger and Lawrence B. Lynn, Serial No. 317,215, filed October 28, 1952, entitled Hydraulic Apparatus, and assigned to the assignee of this invention. It will be appreciated by those skilled in the art that this specific arrangement represents but one way of controlling the boost valve and that other equally obvious and well known methods may be employed.

The valve stem 49 of the boost valve is also controllable by the conventional control stick S through a mechanical linkage which includes the decoupling link 22. To this end, the output rod 21 of the decoupling link is connected to an extension 73 of the piston rod of piston 58. The input rod 20 of the decoupling link is pivotally connected by a pin 74 to a push rod 75 pivotally connected at 76 to the control stick S. Pivot pin 74 is mounted in the upper end of a link 77 pivoted at its lower end to a fixed pivot 78. Link 77 is biased to a given neutral position by means of respective biasing springs 79 and 80 which may be either tension or compression springs as desired. This construction in addition to locating the neutral position of the stick S also preloads the stick in such a way that a degree of "feel" is imparted to manual operation of the stick S which deflects the loading springs 79 and 80.

Means for controlling the autopilot from the stick is provided by the potentiometer 40, the movable tap **40*a* of which is driven by angular displacement of the stick. The voltage of tap 40*a* is applied in any suitable manner to the autopilot 39** to control the output thereof in accordance with the command signal produced at the stick S.

For automatic control of the elevator boost system by the autopilot, which is the first mode of operation described hereinabove and which may be referred to as the cruise mode, the autopilot is adjusted for fixed course operation, in which case the aircraft will be maintained at fixed altitude, and hydraulic fluid pressure is applied to conductors 55. Upon the application of fluid pressure, output rod 21 of the decoupling link is displaced upwardly, as viewed, and the stick S is effectively decoupled from the boost valve stem 49. In this mode of operation, any tendency of the craft to deviate in pitch attitude or in altitude results in selective differential excitation of coils 70 and 71 of the control valve in such a way as to displace the elevator E in a direction to return the craft to the given altitude or to the proper pitch attitude. During this mode of operation, the pitch attitude may be changed by operation of the control stick S. This corresponds to the second mode of operation mentioned hereabove. Upon displacement of the stick S, the voltage of the tap of potentiometer 40 is applied to the autopilot. This signal through the autopilot system produces a differential excitation of coils 70 and 71 in the amount indicated by displacement of the stick S, and the elevator is correspondingly displaced to introduce the control commanded by displacement of the stick. For this mode of operation, the displacement of the stick is insufficient to take up the slack in the linkage introduced at the decoupling link 22, and consequently, the movement of the stick has no direct effect upon the position of valve stem 49.

However, in the event of an emergency, the stick may be displaced sufficiently to take up the slack in the decoupling link after which a direct mechanical connection with valve stem 49 exists. The stick force thus forces the valve stem in the direction of stick movement and overrides the control effect of the autopilot working through the control valve 38. This mode of operation corresponds to mode 3 which was mentioned above.

In the event of failure of hydraulic pressure, fluid pressure is removed from the control valve, the boost valve and the boost cylinder, as well as the decoupling link. The decoupling link under this condition occupies the position illustrated in Fig. 8. In this position, the input rod 20 is coaxially disposed of output rod 21 which establishes a direct mechanical drive across the decoupling link without lost motion. Movement of the stick now displaces valve stem 49 to its limit of mechanical movement in either direction, transferring the stick force to the boost cylinder which displaces the boost cylinder and correspondingly displaces the elevator.

The fifth mode of operation mentioned briefly hereinbefore may be realized, if desired, by providing for the removal of hydraulic fluid pressure from the decoupling link 22 while maintaining fluid pressure on the boost valve. With this arrangement of hydraulic pressure, the stick S is again directly mechanically connected to the boost valve stem 49, and as a consequence, displacement of the stick correspondingly displaces slide valves 50 and 51. Considering the operation when the stick is pulled back, that is angularly displaced clockwise as viewed, valve stem 49 is displaced to the right admitting hydraulic pressure to the right side of power piston 42. This displaces the boost cylinder to the right and applies up elevator. If the stick is pulled back a short distance and then stopped, the motion of the slide valves tops. Hence, as the boost cylinder is displaced, the boost valve housing is displaced with it, and as a consequence, the openings of passages 52 and 53 in the boost valve housing are closed when these openings are again moved to positions adjacent the slide valves 50 and 51. Thus, a given stick displacement results in power system displacement of the elevator surfaces in a corresponding amount.

It will be appreciated that the objects of this invention are accomplished in the apparatus and system disclosed herein, in that, provision is made for the automatic and manual control of an aircraft from a single manual control source, such as the conventional control stick in which suitable fail-safe decoupling is strategically located in the system so that the automatic control may be controlled from the conventional stick, and in the event of power failure, for instance, fluid pressure failure, fail-safe operation of the decoupling feature exists so that at all times the human pilot may control the aircraft from the single conventional stick.

Although but two embodiments of this invention have been illustrated herein with respect to certain details of this system and but one embodiment with respect to the overall system, it will be appreciated by those skilled in the art that numerous other variations of the system, both as to its components and as to the organization of such components, may be realized without departing from the spirit and scope of this invention. For example, the illustrated decoupling linkage may be modified to embody telescoping linkages between the control stick and the elevator in which case structural modifications in the organization of the details will be required to permit telescoping of the coaxially disposed linkage sections. Such modifications while differing in design detain again embody the principles herein disclosed. Accordingly, it is intended that the foregoing disclosure and the showing made in the drawings shall be considered only as illustrative of the principles of this invention and are not to be interpreted in a limiting sense.

We claim as our invention:

1. A control system for controlling a control surface of an aircraft comprising, a manual controller, a servo connected to said control surface to drive said control surface, a power supply for said servo, a servo controller connected between said power supply and said servo, a decoupling link connected between said manual controller and said servo controller providing a mechanican connection therebetween in one position of the decoupling link and removing said connection in a second position of said decoupling link, and means responsive to the power of said power supply and connected with said decoupling link for operating said decoupling link to said second position.

2. A control system for controlling a control surface of an aircraft comprising, a manual controller, a control system for driving said control surface, a power supply for said control system, a linkage connecting said manual controller to said control surface, and means responsive to said power supply and connected to said linkage for disconnecting said manual controller from said control surface.

3. A control system for controlling a control surface of an aircraft comprising, a manual controller, a first longitudinally movable rod member having one end connected to said manual controller to be moved thereby, a second longitudinally movable rod member coaxially disposed of said first rod member and adapted for connection to said control surface, a pin on one rod member, a movable link having a slot therein engaging said pin, pivot means on the other rod member pivotally mounting said movable link thereon with said slot disposed transversely of the path of movement of said rod members, an actuator having a connection with said movable link for effecting relative movement between said pin and said slot in one sense when power is applied to said actuator, a resilient member having a connection with said movable link for effecting relative movement between said pin and said slot in a reverse sense, a servo connected to said control surface, a power supply for said servo, a power controller connecting said power supply to said servo, means connecting said power controller to said second rod member to be controlled thereby, and means connecting said power supply to said actuator.

4. A decoupling linkage comprising, a pair of longitudinally movable substantially coaxially disposed elongated members, the outer ends of said elongated members being adapted for connection to respective devices to be linked, a movable member having a slot therein, a pin on one elongated member, pivot means on the other elongated member pivotally mounting said movable member thereon with said slot engaging said pin on said one elongated member and with said slot disposed substantially transversely of the path of movement of said elongated members, an actuator having a connection with said movable member for effecting relative movement between said pin and said slot in one sense for decoupling said elongated members, and a resilient member having a connection with said movable member for effecting relative movement between said pin and said slot in an opposite sense.

5. A decoupling linkage comprising, a pair of longitudinally movable elongated members arranged in substantially end-to-end relation, a link having a slot therein, means pivotally connecting one end of one elongated member to said link at one end of said slot with said slot disposed substantially transversely of the path of movement of said elongated members, a pin on the end of said other elongated member adjacent said one end of said one elongated member, said pin engaging said slot, spring means biasing said pin to said one end of said slot, and means connected to said other elongated member for biasing said pin away from said one end of said slot for decoupling said elongated members.

6. A decoupling linkage comprising, a pair of longitudinally movable rods arranged in substantially end-to-end relation, a link having a slot therein, means pivotally connecting said link to one of said rods at one end of said slot with said slot disposed substantially transversely of the path of movement of said rods, a pin on the other of said rods engaged with said slot, a spring mounted on said link and engaging said other rod and biasing said pin toward said one end of said slot, and an actuating device mounted on said link and engaging said other rod for moving said pin away from said one end of said slot for decoupling said rods.

7. A decoupling linkage comprising, a pair of longitudinally movable rods arranged in substantially end-to-end relation, a link having a slot therein, means pivotally connecting said link to one of said rods at one end of said slot with said slot disposed substantially transversely of the path of movement of said rods, a pin on the other of said rods engaged with said slot, a spring mounted on said link and engaging said other rod and biasing said pin toward said one end of said slot, an actuating device mounted on said link and engaging said other rod for moving said pin away from said one end of said slot for decoupling said rods, and stop means engageable with said link for limiting angular displacement of said link about said pivot means.

8. A decoupling linkage comprising, a pair of longitudinally movable rods arranged in substantially end-toend relation, a link having a slot therein, means pivotally connecting said link to one of said rods at one end of said slot with said slot disposed substantially transversely of the path of movement of said rods, a pin on the other of said rods engaged with said slot, a spring mounted on said link and engaging said other rod and biasing said pin toward said one end of said slot, and a hydraulic actuator mounted on said link and having a movable portion engaged with said other rod for moving said pin away from said one end of said slot for decoupling said rods.

References Cited in the file of this patent

UNITED STATES PATENTS

| | | |
|---|---|---|
| 2,057,877 | Bragunier | Oct. 20, 1936 |
| 2,205,610 | Van Nes | June 25, 1940 |
| 2,471,821 | Kutzler | May 31, 1949 |
| 2,487,116 | Eaton | Nov. 8, 1949 |
| 2,558,514 | De Jarlais | June 26, 1951 |
| 2,678,177 | Chenery | May 11, 1954 |